S. F. WYCKOFF.
JOINT FOR WOODEN COLUMNS, CONDUITS, AND THE LIKE.
APPLICATION FILED SEPT. 10, 1912.
1,070,572.
Patented Aug. 19, 1913.
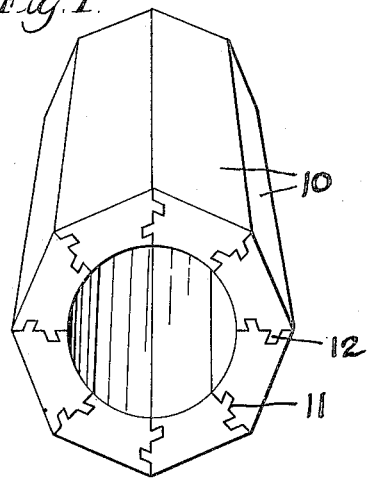
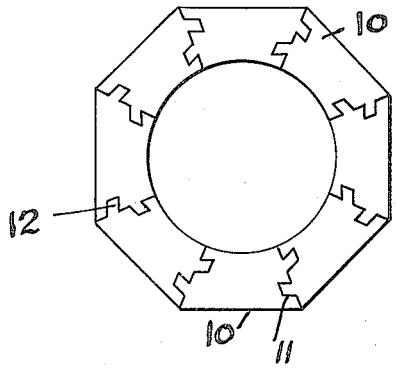
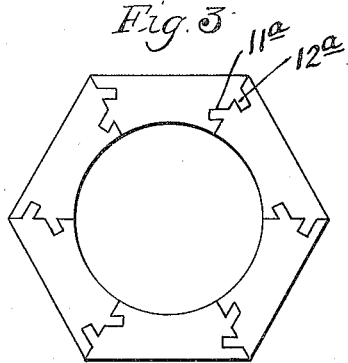
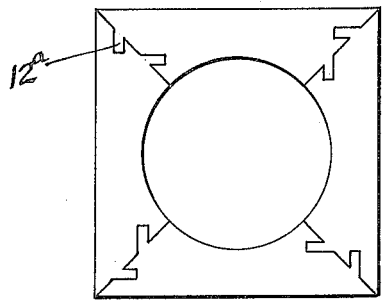
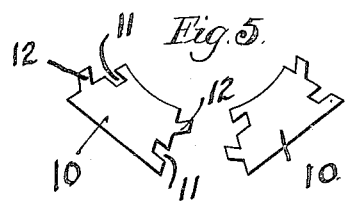
WITNESSES:
T. S. Coleman
M. O. Williams
INVENTOR:
S. F. Wyckoff
BY
Beach + Fisher
ATTORNEYS.

UNITED STATES PATENT OFFICE.

SPOFFORD F. WYCKOFF, OF STAMFORD, CONNECTICUT.

JOINT FOR WOODEN COLUMNS, CONDUITS, AND THE LIKE.

1,070,572.  Specification of Letters Patent.  Patented Aug. 19, 1913.

Application filed September 10, 1912. Serial No. 719,565.

*To all whom it may concern:*

Be it known that I, SPOFFORD F. WYCKOFF, a citizen of the United States, residing in Stamford, county of Fairfield, and State of Connecticut, have invented certain new and useful Improvements in Joints for Wooden Columns, Conduits, and the Like, of which the following is a full, clear, and exact description.

This invention relates to an improved form of interlocking joint especially adapted for use in sectional wooden columns or sectional wooden conduits and the like, where it is desirable to have the meeting edges of comparatively long sections interlocked in as simple and inexpensive a manner as possible.

The object of my invention is to provide a joint of this character which is especially effective in interlocking the parts and which moreover, combines the advantages of facility of manufacture and inexpensiveness of production.

More particularly, it is aimed to provide interlocking tongue and groove joints for wooden sections and the like in which neither the tongues nor the grooves are undercut. The grooves may be formed by a straight sided or more or less pointed tool so that the difficulties and expense attendant on the formation of dovetail grooves are eliminated.

To these ends the invention consists in the novel features and combinations of parts to be hereinafter described and claimed.

In the accompanying drawing, Figure 1 is a perspective view of an octagonal column or conduit embodying my invention, Fig. 2 is an enlarged end elevation of the same, Fig. 3 is a view similar to Fig. 2 but showing a hexagonal structure having a joint of slightly modified form, Fig. 4 shows the application of the improvements to a column or conduit of square cross-section, and Fig. 5 is a detail of the joint shown in Fig. 2.

Referring to the drawing, and particularly to Figs. 1, 2 and 5, the column or conduit is shown as composed of a plurality of sections 10 (usually wood) having mitered meeting edges interlocked with each other by means of a special interlocking joint.
This joint is formed, as shown in Fig. 5, by providing each edge of every section 10 with a groove 11 and a tongue 12 arranged at an angle to each other. The mouth of the groove 11 is at least as wide as any other part of the groove, and the neck of the tongue 12 is at least as wide as any other part of the tongue. As neither the tongue nor groove is of the dovetailed or undercut form, the manufacture of the joint is very considerably facilitated and its cost is considerably lowered and yet the tongue and groove of one section may be positively interlocked with the groove and tongue respectively of the adjacent section owing to the inclination of the tongues and grooves at an angle to each other. In order to lock two of the sections 10 together it is obvious that it will be necessary to slide the sections longitudinally relative to each other after placing one section adjacent the end of the other section and with its tongue and groove in register with the groove and tongue respectively of the other section, as will be understood. Every joint between the different sections is an interlocking joint and hence the rigidity of the whole structure is increased. In case the structure is used as a conduit the joint may be readily formed in such a manner as to prevent leakage; in other words, the construction is such that the parts may be readily made to fit together accurately and thereby form a water-tight joint.

In the form shown in Figs. 1, 2 and 5 the free edges of the tongues 12, and the bottoms of the grooves 11, are cut on a line parallel to the face of the joint which, in the case illustrated, is a radial line. In Fig. 3 the construction is very similar, but the free edges of the tongues 12$^a$ and the bottoms of the grooves 11$^a$ are arranged at an angle to the radial line of division between the sections. This arrangement is adhered to in the form shown in Fig. 4.

It will be noted that in all of the forms shown the axes of the grooves at the respective ends of each section are approximately parallel to each other and approximately perpendicular to an imaginary line extending transversely of the section substantially at the center thereof. In the cases shown this transverse median line corresponds to the radius of the completed structure. The tongues of the section, on the other hand, are approximately perpendicular to the transverse median lines of the respective adjacent sections. This arrangement of the tongues and grooves not only provides a very effective water-tight interlocking joint between each section and its neighbor, but also facilitates very materially the operation of cutting the tongues and grooves in a planing machine.

It is preferred to have the joint surfaces extend radially of the structure in a single plane and to have the tongue and groove at each end of each section spaced laterally from each other, but these features are not essential in all aspects of the invention. Moreover, it will be apparent that the invention is applicable to the joints of boxes and various structures other than columns or conduits.

Without limiting myself to the precise construction shown, I claim:

1. In a structure such as described, the combination of a pair of sections having meeting joint surfaces at their adjacent ends, each section being provided at the end with a non-undercut groove approximately perpendicular to the median transverse line of said section and with a non-undercut tongue approximately perpendicular to the median transverse line of the other section, the tongue and groove of one section being interlocked with the groove and tongue respectively of the other section; substantially as described.

2. In a structure such as described, the combination of a plurality of sections individually and collectively interlocked to form a hollow body, each section being provided at each end with a non-undercut groove extending approximately perpendicularly to the median transverse line of said section, and a non-undercut tongue on each end of each section spaced from the groove at that end and extending into the groove of the adjacent section; substantially as described.

3. In a structure such as described, the combination of a plurality of sections, each section having joint surfaces at the respective ends lying in planes extending radially of the structure, each end of each section being provided with a non-undercut groove extending approximately perpendicularly to the median line of said section and at an angle to the joint surface, and further provided with a non-undercut tongue spaced from the groove and extending angularly from the joint surface into the groove of the adjacent section; substantially as described.

In witness whereof, I have hereunto set my hand on the 6th day of September, 1912.

SPOFFORD F. WYCKOFF.

Witnesses:
IRA S. BOWER,
C. W. BOWER.

---

Copies of this patent may be obtained for five cents each, by addressing the "Commissioner of Patents, Washington, D. C."